March 26, 1957

A. R. STEIRLY 2,786,485

SLUSH PUMP VALVE

Original Filed Feb. 25, 1944

INVENTORS
A. R. STEIRLY, DECEASED
L. S. ROZZELL, ADMINISTRATRIX

BY Jack W. Hayden

ATTORNEY

United States Patent Office 2,786,485
Patented Mar. 26, 1957

2,786,485

SLUSH PUMP VALVE

Albert R. Steirly, deceased, late of Houston, Tex., by Lois Steirly Rozzell, administratrix, Rockport, Tex., assignor, by mesne assignments, to American Iron & Machine Works Company, Inc., Oklahoma City, Okla., a corporation of Delaware Continuation of abandoned application Serial No. 134,704, December 23, 1949, which is in turn a continuation of abandoned application Serial No. 523,813, February 25, 1944. This application August 13, 1951, Serial No. 241,658

1 Claim. (Cl. 137—533.25)

The invention relates to a slush pump valve and seat which is particularly adapted for controlling the flow in pumps used in circulating the slush or drilling mud in the rotary method of drilling wells.

This application is a continuation of my prior co-pending application Serial Number 134,704 for a Slush Pump Valve filed Dec. 23, 1949, which is in turn a continuation of my prior application, Serial No. 523,813, for a Slush Pump Valve filed February 25, 1944. Both of these prior applications are now abandoned. This application is entitled to the benefit of the filing date of February 25, 1944.

Slush pump valves are subjected to tremendous pressures during the well drilling operations so that they must be sturdy in their construction and at the same time they are subjected to the flow of the slush of mud which carries considerable abrasive material so that the parts must be so constructed as to avoid excessive wear with a view of giving extended service.

It is one of the objects of the present invention to provide a valve and seat construction wherein the flow is streamlined through the valve and the parts are constructed to give a maximum of service.

Another object of the invention is to provide a slush pump valve and seat ring wherein cooperating parts on the ring and valve provide an annular curved sealing surface so that the maximum area of the valve and ring are in contact with each other while presenting a minimum of resistance to flow of the slush being pumped.

Another object of the invention is to provide a slush pump seat ring having a spider and hub therein which act as a guide and stopping arrangement for the valve.

Another object of the invention is to provide a plurality of guide and wear resistant rings on a slush pump valve stem so as to guide the stem and prevent all but the minimum of wear thereon.

Another object of the invention is to provide a valve seat ring having an annular curved sealing face which is convex in vertical section.

Another object of the invention is to provide a slush pump valve having a resilient seal ring which has an annular curved sealing face which is concave in vertical cross section.

Another object of the invention is to provide a locking clamp to retain the removable parts of the slush pump valve in position.

Other and further objects of the invention will be readily apparent when the following description is considered in connection with the accompanying drawings wherein.

The slush pump body or deck 2 is usually provided with an opening or passage 3 which is arranged to receive the slush pump valve seat ring 4 which is tapered to fit the opening and is usually driven into position to form a seal with the pump deck.

Figure 1:
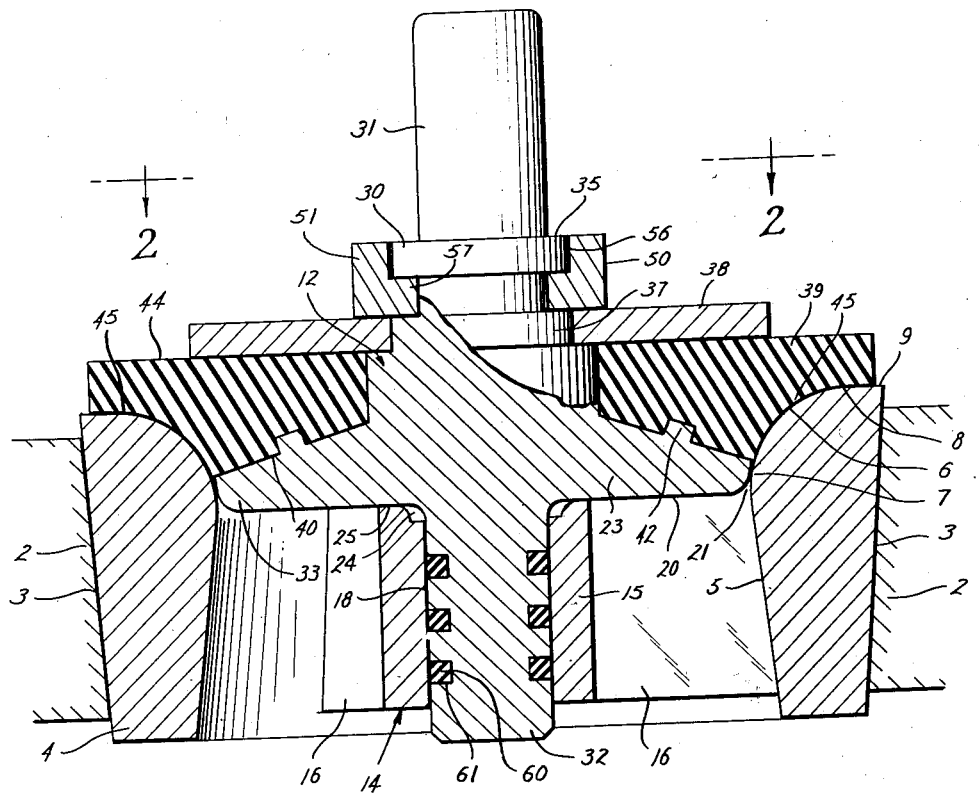
Fig. 1 is a vertical sectional view showing the valve seated in the seat ring and with the parts in sealing position.

The metal seat ring shown in Fig. 1 is of peculiar configuration in that the central passage therethrough is defined by a downwardly flaring straight tapered wall 5 which merges with an annular upwardly flaring convexly curved sealing surface 6 which constitutes the upper end of the seat ring.

It will be noted that there are no sharp corners or changes in direction of the flow surface of this passage 5 because the straight portion of the surface begins a curve at 7 which may be an arc of a circle or it may be an irregular curve as desired. Such curve, however, forms a convex surface in section as seen in Fig. 1. This surface continues at a curvature to about the point 8 where it preferably becomes horizontal and extends outwardly then in a horizontal plane to the peripherial edge 9 of the ring.

A curved sealing face or surface of this sort is of advantage because the valve member 12 moves upwardly out of the passage a limited distance and the flow through the valve must be directed laterally as it passes over the sealing face 6 so that the curved surface presents an area which conforms to the natural flow lines of the fluid and permits a maximum volume to pass through the valve.

Figure 3:
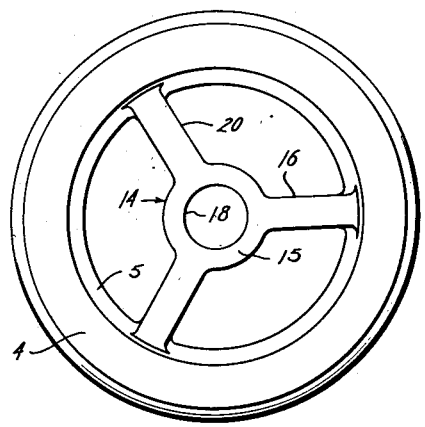
Fig. 3 is a bottom view looking up into the seat ring and illustrating the arrangement of the spider therein.

This seat ring 4 is provided with a spider 14 best seen in bottom plan view in Fig. 3 wherein a hub 15 is supported by a plurality of arms 16 which join with the hub and with the peripherial surface 5 to form an integral supporting structure. The hub 15 has a central opening 18 therethrough to act as a guide for the slush pump valve while the arms or ribs 16 as seen in Fig. 1 have a stopping surface 20 thereon which surface is at the elevation where it is desired to stop the valve on its downward movement at about the time that a seal is accomplished with the sealing surface 6. Particular attention is directed to the fact that the ribs 16 curve upwardly slightly at 21 where they join with the body of the ring. In this manner the stopping surface 20 is of a curved configuration to receive the body portion 23 of the valve 12.

The hub 15 is cut away as at 24 to provide a slight opening or recess for the escape of any solid matter which might be resting upon the surface 25 when the valve moves to closed position. On the upstroke the flow of liquid would tend to flush out this depression 25 so as to insure an escape space for solid matter so that a positive seating of the valve would be obtained.

The valve 12 is made up of a metal forging or casting 30 which has the upper stem 31 and the lower stem 32 projecting therefrom and has the radial flange 33 which projects out from the center portion of the body. The upper stem 31 is formed with an outstanding rib 35 thereon which forms a recess of the same diameter as the stem, below such flange. The body of the flange is also stepped at 37 so as to receive the hold down or retainer plate 38 which in turn confines the sealing or rubber ring 39 which is mounted upon the upper surface 40 of the flange 33 and which fits about the cylindrical portion 41 of the body. An annular rib 42 may be upstanding from the surface 40 and assist in retaining the sealing ring 30 in position.

The seal ring 39 is of peculiar configuration in that its upper surface 44 is preferably flat while the balance of the ring is arranged to fit the body and flange of the valve. The sealing surface 45 of this ring is an annular concave portion which is complementary with the surface 6 on the valve seat so that the two surfaces cooperate together to form a seal immediately upon their coming in contact with each other as the valve moves down to closed position.

In order to retain this sealing ring in place a retainer plate 38 made in either one or more parts may be deposited on top of the resilient ring 39 so as to engage about the stepped portion of the body.

Figure 2:
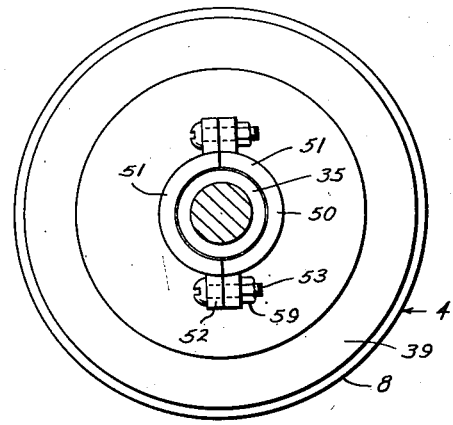
Fig. 2 is a section taken on the line 2—2 of Fig. 1 to illustrate the construction of the locking clamp.

To hold the retainer plate in position a locking clamp 50 has been applied, and as best seen in Fig. 2, is made up of the two semi-circular segments 51, each of which has the wing ends 52 thereon. A bolt 53 passing through the two adjacent wings of two of the segments permits drawing of the segments together so that the rib 35 fits into the reduced portion 56 of the clamp. In this manner the lower extension 57 of each of the segments fits beneath the rib or flange 35 so that the segments hold the retainer plate 38 firmly in position. When it is desired to replace any of the parts of the valve the nuts 59 can be removed from the bolts 53, the segments knocked out of position and the parts replaced as desired.

In order to facilitate the guiding and movement of the valve the lower stem 32 has a plurality of annular recesses 60 therein, each of which carries a ring 61 of a suitable material, such as rubber as shown in the drawing, which will bear against the opening 18 and prevent excessive wear on the stem. It has been found in actual practice that these protective rings very greatly extend the service which is obtainable because of the fact that the guide stem is one of the principal locations for wear. This is true because the mud pressure from beneath exerts a pressure against the stem and tends to flow into the passage 18 while on the downstroke the portion of the stem above the hub 15 becomes coated with the abrasive liquid and tends to carry it down into the hub.

Broadly the invention contemplates a slush pump valve having details of construction therein which permit ready replacement of the parts and extended service in actual operation.

What is claimed is:

A slush pump valve and seat assembly comprising an annular metal seating ring having an outer peripheral surface adapted to fit within an opening in a pump body, the inner periphery of said seating ring providing a vertically extending flow passage through said seating ring, said flow passage having a downwardly flaring lower portion and an upper portion flaring upwardly and outwardly from the juncture of said upper and lower portions into a horizontally disposed portion at the juncture of said upper portion and said outer peripheral surface, said upper portion including a sealing surface which is located above and radially inward of a surface of revolution coaxial with said flow passage whose generatrix is a straight line extending between the juncture of said upper portion with said lower portion and the juncture of said upper portion with said outer peripheral surface, a plurality of vertical metal webs connected to said inner periphery of said seating ring in the lower portion thereof and extending radially inwardly of said flow passage, a metal valve stem guide connected to the inner ends of said webs and having a vertical cylindrical opening coaxial with said flow passage, said webs having coplanar horizontal upper surfaces, a metal valve including a lower stem slidably received in said valve stem guide opening for movement of the valve between an upper open position and a lower closed position, said lower stem having a generally cylindrical portion on its outer periphery fitting slidingly in said cylindrical opening, said cylindrical portion of said lower stem having a plurality of annular grooves therearound spaced apart from each other and the lower end of said lower stem and a rubber ring disposed in each of said grooves, the outer peripheries of said rubber rings and said lower stem being substantially flush, said valve further including a body integral with the upper end of said lower stem, said body including a flange having a lower, generally horizontal surface parallel with the upper surfaces of said webs, an inclined peripheral surface on said flange extending upwardly and outwardly from said lower surface of said flange to the upper surface of said flange, said peripheral surface of said flange being adapted to engage the lower portion of said sealing surface on said ring when said valve is closed, the upper surface of said flange flaring downwardly, said valve including also an upper valve stem coaxial with said lower valve stem and extending centrally upwardly from said upper surface of said flange and integral therewith, said stem being cylindrical and smooth, an annular rubber sealing member removably mounted on said upper surface of said flange, said sealing member having on its lower surface radially outward of said flange a downwardly facing sealing portion complementary to and adapted to engage with the upper portion of said sealing surface of said seating ring when said valve is closed, said sealing member having its radial outermost peripheral surface located concentrically above said upper portion of the seating ring when said valve stem is received in said valve stem guide, said lower surface of said sealing member curving smoothly inwardly from said peripheral surface of said sealing member into a direction tangential with said peripheral surface of said flange.

References Cited in the file of this patent

UNITED STATES PATENTS

| Number | Name | Date |
|---|---|---|
| 860,820 | Norton | July 23, 1907 |
| 1,312,730 | Horn | Aug. 12, 1919 |
| 1,594,517 | Dufty | Aug. 3, 1926 |
| 1,653,369 | Murphy | Dec. 20, 1927 |
| 1,710,635 | Wertz | Apr. 23, 1929 |
| 1,847,058 | Yanchenko | Feb. 23, 1932 |
| 1,882,433 | MacClatchie | Oct. 11, 1932 |
| 2,093,662 | Steirly | Sept. 21, 1937 |
| 2,163,472 | Shimer | June 20, 1939 |
| 2,197,455 | Volpin | Apr. 16, 1940 |
| 2,223,651 | White | Dec. 3, 1940 |
| 2,233,649 | Stahl | Mar. 4, 1941 |
| 2,495,880 | Volpin | Jan. 31, 1950 |
| 2,516,927 | Steirly | Aug. 1, 1950 |